United States Patent [19]

Lambuth et al.

[11] Patent Number: 4,906,484

[45] Date of Patent: Mar. 6, 1990

[54] ELECTRICALLY CONDUCTIVE LIGNOCELLULOSE PARTICLE BOARD

[75] Inventors: Alan L. Lambuth, Boise; Comer Brown, Meridian, both of Id.

[73] Assignee: Boise Cascade Corporation, Boise, Id.

[21] Appl. No.: 146,845

[22] Filed: Jan. 22, 1988

[51] Int. Cl.$^4$ ................................................ B05D 3/12
[52] U.S. Cl. ........................... 428/326; 156/62.2; 162/142; 428/323; 428/328; 428/408; 428/537.1
[58] Field of Search .............. 428/323, 326, 328, 408, 428/537.1; 162/142, 148; 156/62.2

[56] References Cited

U.S. PATENT DOCUMENTS

| | | | |
|---|---|---|---|
| 1,379,155 | 5/1921 | Acheson, Jr. | 162/181.9 |
| 1,379,156 | 5/1921 | Acheson, Jr. | 427/121 |
| 2,328,198 | 8/1943 | Davenport et al. | 204/2 |
| 2,372,929 | 4/1945 | Blessing | 428/164 |
| 2,593,146 | 3/1952 | Howard | 428/530 |
| 2,926,829 | 3/1960 | Wilkins | 229/3.5 R |
| 3,048,515 | 8/1962 | Dalton | 162/126 |
| 3,096,229 | 7/1963 | Whitman | 162/135 |
| 3,149,023 | 9/1964 | Bodendorf et al. | 162/135 |
| 3,265,557 | 8/1966 | De Frics | 162/138 |
| 4,160,503 | 7/1979 | Ohlbach | 206/328 |
| 4,442,139 | 4/1984 | Brigham | 428/408 |
| 4,664,856 | 5/1987 | Talbott et al. | 162/192 |

*Primary Examiner*—George F. Lesmes
*Assistant Examiner*—Christopher Brown
*Attorney, Agent, or Firm*—Eugene D. Farley

[57] ABSTRACT

An electrically conductive medium or high density lignocellulose particle board useful in the manufacture of flooring, wall paneling, and furniture functioning to establish static-free environments for the manufacture and operation of microcomputers and related equipment and protection from static electrical discharge problems generally. The particle boards comprise dry-formed, hot-consolidated mixtures of

| | |
|---|---|
| finely divided, electrically conductive carbon particles | 0.2–5 |
| particle board adhesive | 1.5–15 |
| lignocellulosic particles | balance |

In this composition the carbon particles are characterized by having specific surface areas of at least 20 square meters per gram. The lignocellulose particles comprise lignocellulose chips and flakes having width to length ratios within the range of from 1—1 to 1-20, and lignocellulose strands having width to length ratios within the range of from 1—1 to 1-40 and minimum widths of one millimeter.

26 Claims, 2 Drawing Sheets

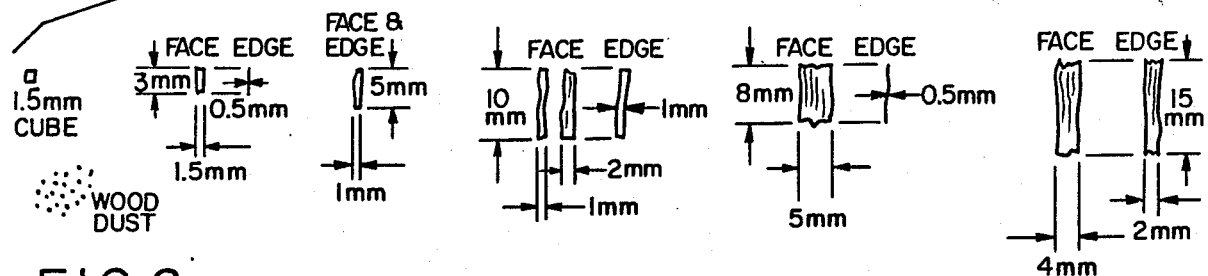
FIG. 1 TYPICAL FULL-SIZE CHIPS
NOTE: CHIP ENDS TYPICALLY ARE BLUNT
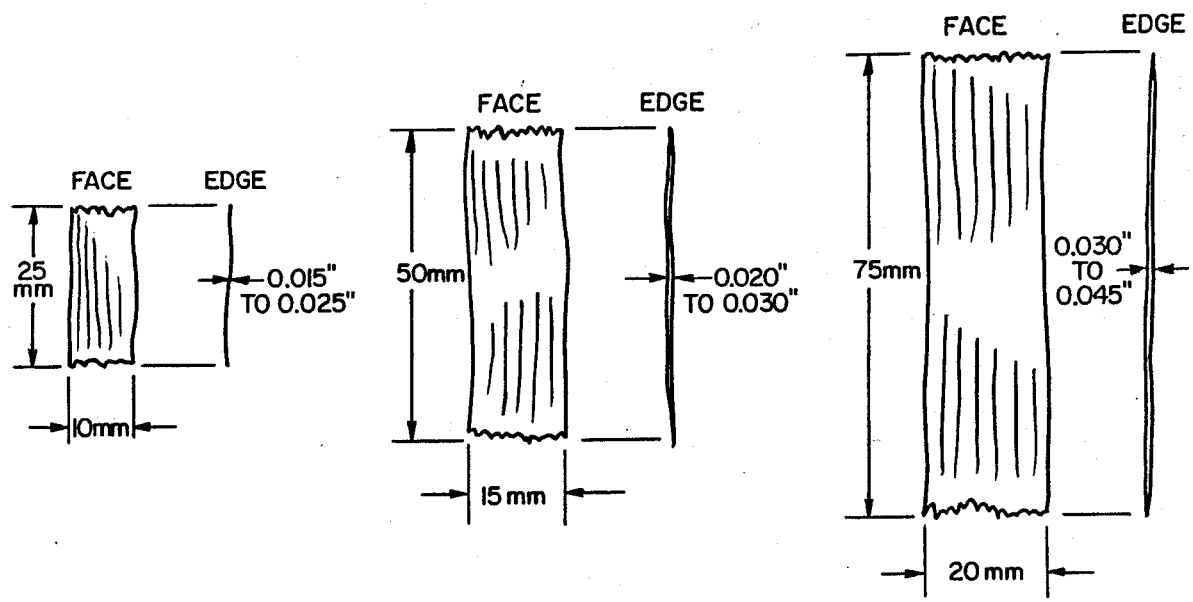
FIG. 2 TYPICAL FULL-SIZE FLAKES
NOTE: FLAKES TYPICALLY ARE TAPERED ON THE FLAT ENDS
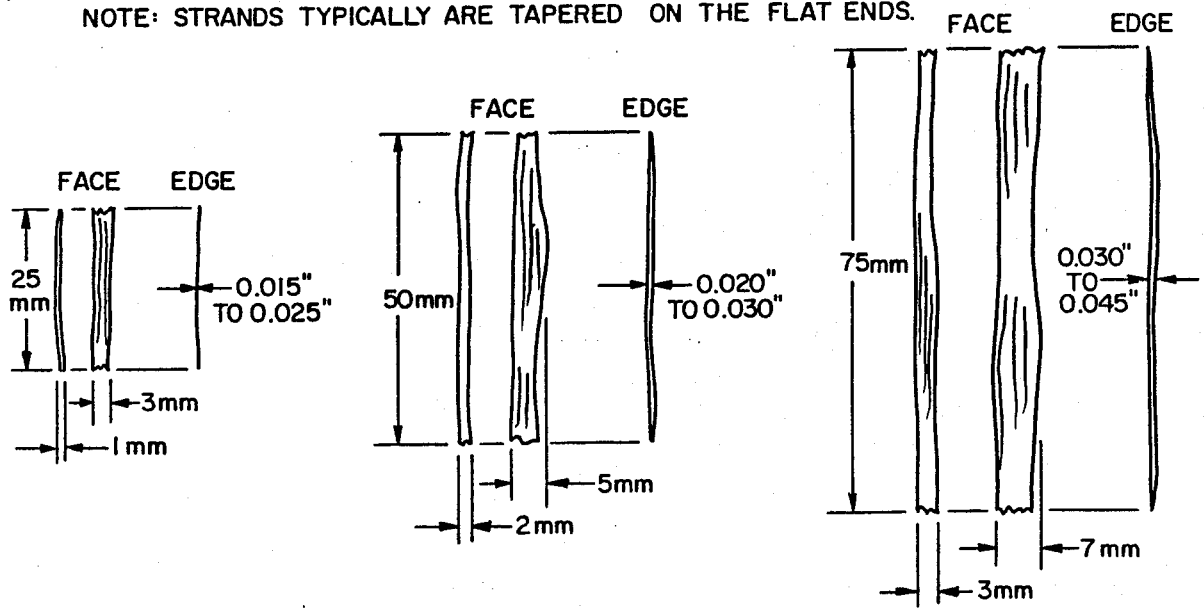
FIG. 3 TYPICAL FULL-SIZE STRANDS
NOTE: STRANDS TYPICALLY ARE TAPERED ON THE FLAT ENDS.

FIG. 4
TYPICAL FULL-SIZE FIBERS
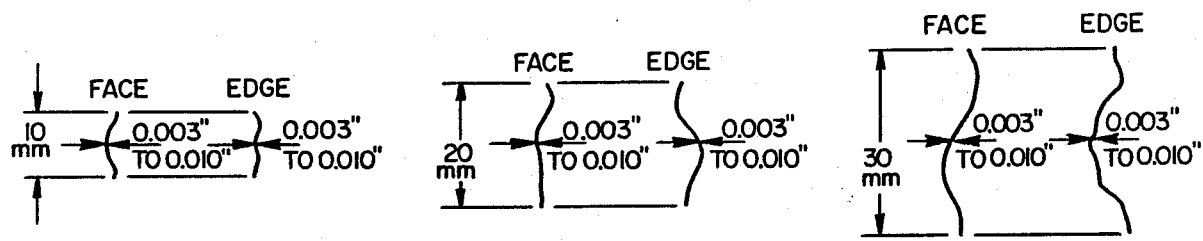
OTHER FREQUENTLY-ENCOUNTERED FIBER FORMS
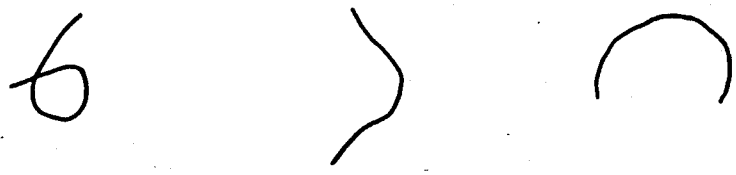

ELECTRICALLY CONDUCTIVE LIGNOCELLULOSE PARTICLE BOARD

BACKGROUND AND GENERAL STATEMENT OF THE INVENTION

This invention relates to electrically conductive lignocellulosic particle boards. It pertains particularly to electrically conductive lignocellulosic particle boards of use in establishing static-free environments for the manufacture and operation of microcomputers and associated and/or related components and equipment, as well as for the control of static electrical discharge problems generally.

Important locations which must be protected from static electrical accumulation and discharge include any involved with the production or use of volatile inflammable liquids and gases. Hospital operating rooms are an example. Quoting from Sections 3—3.6.1.2 and 1.3 of the Americal National Standards Institute/National Fire Protection Standard 99 for Health Care Facilities:

1.2 "The prevention of the accumulation of static charges revolves about a number of safeguards which shall be complied with in flammable anesthetizing locations, in corridors and passageways adjacent thereto, in rooms connecting directly to anesthetizing locations, such as scrub rooms and sterilizing rooms, and in storage locations for flammable anesthetics located win an operating suite."

1.3 "The method employed to prevent such accumulation include the installation of conductive floor (see 3—3.6.2), the maintenance of the relative humidity at 50 percent at least, and the use of certain items of conductive equipment, accessories and wearing apparel."

It is well known that the operating voltages of microcomputers and related equipment are now so low that the discharge of static electricity in the vicinity of the equipment may easily erase the memory or even damage the microcircuits of the equipment, to the great dismay of both equipment manufacturers and users. As a result, every effort must be made to produce and operate the equipment in a static-free environment, including the provision of electrically-grounded furniture, floors and walls in the equipment production facilities and user installations.

In such rooms and booths, it is common practice to use lignocellulosic particle boards, particularly wood particle boards, having thicknesses in the range of from one-eighth to two inches in the manufacture of the flooring, wall panels, cabinets and furniture.

Such particle boards are conventionally made by comminuting wood or other lignocellulose to the form of small pieces, blending mixtures of the small pieces with a suitable thermosetting adhesive, dry-forming the resulting mixture into a mat, and hot-pressing the mat (in a platen press) to the desired density and thickness.

Varieties of particle board manufactured in this manner are chipboard, flakeboard, and strand (or sliver) board, which is used in the manufacture of oriented "strand boards". Closely related fiber-based products are conventionally termed low density, medium density and high density fiberboards.

Following are product definitions from various recognized sources;

Particle board is a generic term for a panel manufactured from lignocellulosic materials (usually wood) primarily in the form of discrete pieces or particles, as distinguished from fibers, combined with a synthetic resin or other suitable binder and bonded together under heat and pressure in a hot press by a process in which entire interparticle bond is created by the added binder and to which other materials may have been added during manufacture to improve certain properties. (ASTM D-1554-86, Standard Definitions of Terms Relating to Wood-base Fiber and Particle Panel Materials).

Chipboard is a particle panel composed of small pieces of wood chopped off a larger piece by axe-like cuts as in a chipper of the paper industry, or produced by mechanical hogs, hammermills, etc. (ASTM D 1554-86). The term chipboard is frequently used to identify particle board made from mill waste raw materials such as planer shavings, hogged mill ends and sawdust.

Flakeboard is a particle panel composed of flakes. Flakes are small flat wood particles of predetermined dimensions, substantially uniform in thickness, with fiber direction essentially in the plane of the flake; in overall character resembling a small piece of veneer. It is produced by special equipment for use in the manufacture of flakeboard. (Wood Handbook: Wood as an Engineering Material. USDA Agriculture Handbook 72).

Oriented Strandboard is a type of particle panel product composed of strand-type flakes which are purposely aligned in directions which make a panel stronger, stiffer and with improved dimensional properties in the alignment directions, as compared with a panel with random flake orientation. (Wood Handbook: Wood as an Engineering Material (USDA Agriculture Handbook 72).

Fiberboard is a dry formed panel product manufactured from lignocellulosic fibers combined with a synthetic resin or other suitable binder. The fibers are slender, threadlike elements resulting from the chemical or mechanical defiberization of woody materials, with or without steam refining. In the manufacture of medium density fiber board, the panels are compressed to a density of 0.50 to 0.80 gm./cm cm, in a hot press by a process in which substantially the entire interfiber bond is created by the added binder. Other materials may have been added during manufacture to improve certain properties. (American National Standard, Medium Density Fiberboard for Interior Use. ANSI A208.2-1980).

All of these products are to be distinguished from paper products based on chemically pulped wood fibers in that (1) they comprise lignocellulose products rather than cellulosic products from which the lignin has been removed and (2) they have appreciable thickness (herein from $\frac{1}{8}$-inch to 2-inches) and hence have appreciable structural strength. As noted, they have primary application as flooring, wallboard, cabinets and furniture components.

Electrically conductive paper products are known. As illustrated in Davenport et al. U.S. Pat. No. 2,328,198, they are manufactured by including electrically conductive carbon particles in the papermaking furnish which is converted to the finished paper sheet. Alternatively, as illustrated in Ohlbach, U.S. Pat. No. 4,160,503, they may be manufactured by sprinkling electrically conductive carbon particles on the surfaces of paper or paperboard sheets. The object is to provide on or in the sheet a continuous, electrically conducting path which in use leads to ground any electric charges which may develop on the sheet.

However, particle board products having this desired capacity have not heretofore been developed. Manifold problems attend the manufacture of electrically conducting boards using comminuted lignocellulose as a primary raw material. As will be shown hereinafter, certain forms of lignocellulose of reduced size, for example refined wood fibers, are not operable. Similarly, all electrically conductive materials are not operable, for example electrically conductive inorganic salts, or even particles of electrically conducting metals or metal oxides such as aluminum oxide and iron oxide. Still further, although finely divided carbon particles are operable, they function successfully only within carefully defined parameters.

Accordingly it is the general object of the present invention to provide a particle board product useful in the described and related applications.

A further important object of the present invention is the provision of such a product at various controllable levels of conductivity produced by procedures which are compatible with current conventional particle board manufacturing operations.

We have discovered that electrically conductive particle boards of the class described may be manufactured practically and economically at various controllable levels of conductivity by procedures which are compatible with current particle board manufacturing procedures by dryforming and subsequently hot-consolidating a mat having the following composition, in % by weight, dry solids basis:

| Finely divided, electrically conductive carbon particles | 0.2–5 |
|---|---|
| particle board adhesive | 1.5–15 |
| lignocellulose particles | balance |

In the foregoing, the lignocellulose particles comprise at least one member of the group consisting of lignocellulose chips, lignocellulose flakes, and lignocellulose strands.

In addition to the above, minor proportions of process fines and of additives such as pigments, fire proofing agents, rot proofing agents, wax emulsions and the like may be employed as desirable or necessary for particular purposes.

To secure effective, complete coverage of the foregoing lignocellulosic components, the carbon particles used with them must have surface areas of at least 20 square meters per gram.

When these conditions are fulfilled, electrically conductive particle products may be fabricated from wood and other forms of lignocellulose in the form of boards or billets having the desired properties.

THE DRAWINGS

In the drawings:

FIG. 1 comprises diagrammatic views of lignocellulosic chips of the class under consideration herein.

FIG. 2 comprises diagrammatic views of lignocellulosic flakes of the class under consideration herein.

FIG. 3 comprises diagrammatic views of lignocellulosic strands of the class under consideration herein.

FIG. 4 comprises diagrammatic views of lignocellulosic fibers of the class under consideration herein.

DESCRIPTION OF PREFERRED EMBODIMENTS OF THE INVENTION

As indicated above, the principal constituents of the electrically conductive lignocellulose boards of the present invention comprise lignocellulose chips, flakes and strands (herein termed generically "lignocellulose particles"); finely divided carbon particles; and particle board adhesive. Considering each of these in turn, and the critical characteristics which determine their suitability for use in the present invention:

a. The Lignocellulose Particles

The lignocellulose particle component may comprise either wood or other woody materials such as bagasse, rice hulls, straw, corn stalks or the like. The raw materials investigated comprise wood chips, flakes, strands and refined fibers.

The chip particles were prepared from a raw material mixture consisting of hammermilled sawmill trim waste, coarse sawdust, planer shavings and paper pulp chips. This mixture was reduced in particle size by passing it through a Pallman flaker and a Bauer single disc grinder or a hammermill. Chips not passing through an appropriate screen size were recycled and reground. The screened chip stream was metered into a triple-pass heated rotating drum dryer in which the chip moisture content was reduced to about 4%.

The flake particles were prepared from small-diameter debarked green White fir logs. The logs were cut into 24" lengths and were fed against the knives of a rotating disc flaker. The knives of the flaker were set to cut flakes 1¾" long, ½" wide and 0.020" thick with tapered ends. The flakes were then metered into a heated rotating drum dryer which reduced their moisture content to about 4%.

The strand particles were prepared from the White fir flakes described above by passing them rapidly through a hammer mill with a slotted output screen which split the flakes lengthwise into slivers and splinters of much narrower average width. The minimum width was about one millimeter.

The refined fibers were prepared by steam conditioning 1" dry Douglas fir wood chips under 80 to 150 pounds of team pressure for 3 minutes, then passing the conditioned chips under continuing steam pressure through a double-disc refiner with a plate gap setting of 0.012". The fibers thus produced were blown into a storage bin and were metered into a heated revolving drum dryer which reduced their moisture content to about 4%.

From these lignocellulosic raw materials dry process wood particle board was prepared to the specifications of industrial grade particle board widely used as the "core panel" in furniture, floors, decorative wall paneling, cabinets and similar interior furnishings for both residential and commercial construction. The procedure for its manufacture was as follows:

The wood furnish consisted of about 75 percent mixed pine residues, 15 percent Douglas fir and 10 percent White fir in the form of planer shavings, coarsely chipped sawmill trim waste, sawdust and green pulp chips. The mixture was ground and screened into a size range suitable for particle board by passing it through a Pallman chipper that reduces the chunks and finger-size chips to small flakes. Any finer particles present passed through the machine without further size reduction. The Pallman output stream was put through a Bauer single disc grinder that further reduced the size of the chips and increased the percentage of rod-shaped particles and small slivers in order to ensure adequate board stiffness.

The Pallman/Bauer-ground wood chips were then passed through a heated revolving drum dryer to bring their average moisture content down to about four percent, dry wood basis. This dry chip stream is normally fed into plant blending and forming equipment to produce commercial unitary or laminar particle board. However, a quantity was diverted and collected for laboratory use in the production of smaller experimental boards. In either case, the ensuing board production steps were approximately the same, differing mainly in scale.

The experimental boards were produced singly. Thus, the chips for one board were weighed out accurately, the actual weight depending on board thickness and density. In the case of the conductive board experiments, the conductive agent (carbon black, metal oxide, etc.) was added in dry powdered form to the weighed chips. The chips and conductive agent were dry-blended with intensive agitation for one minute to distribute the conductive material as completely as possible over the surface of every wood chip, large and small. One minute of intensive blending was adequate to cause the wood chips to take up all the conductive powder that could be made to cling to them. Any excess simply sifted to the bottom of the blender.

The dry-blended mixture of wood chips and conductive agent was transferred in total to a laboratory-size rotating drum resin blender equipped with internal vanes to continuously lift and cascade the chips during resin application. As the drum rotated slowly (14 RPM) adhesive resin, water and other liquid additives (if any) were atomized and sprayed into the blender at a right angle to the center of rotation under 30 psi air pressure. The spray tip was cycled slowly and continuously from front to rear within the blender to ensure uniform liquid distribution. The application of resin and additives to the chips was accomplished in 4 to 8 minutes depending on quantity and viscosity. The resin, water, wax emulsion and other additives such as lignin solution were sprayed in various combinations and sequences to establish (experimentally) the effect on board conductivity.

The resin-coated chips then were poured into a forming box placed on a stainless steel caul from a height of about two feet, roughly simulating the drop onto the conveyor cauls of a commercial board forming line to form a unitary or laminar mat, as desired. The poured chips were lightly levelled with a spatula and cold pressed within the forming box for 8 seconds at 300 psi to consolidate the loose chips into a mat which could be handled. The forming box was removed and a second stainless steel caul was placed on top of the consolidated mat. Total forming and prepressing time was about two minutes.

The mat, with ¼, ⅜ or ¾-inch steel stop bars placed next to it between the cauls, was inserted into an electrically heated press at a temperature of 330° F. The press was closed in 15 seconds to 600 psi initial pressure and held at this pressure for 30 seconds to bring the mat down to stop thickness (¼, ⅜ or ¾-inch). Then the pressure was reduced to 300 psi for the rest of the pressing cycle. On completion of the 3 to 6-minute hot pressing time, the press was opened and the fully cured board removed. The board was stored 24 hours at room temperature before any electrical or physical tests were performed.

As a variation of this procedure, several boards were made by placing the weighed chips directly in the resin blender in order to coat the chips with adhesive first. Then the conductive agent was charged into the resin blender and the tumbling action continued for about three minutes. The rest of the board forming and pressing procedure remained as outlined above. Table 9, experiments 18A and 23A, infra, show that this reversed application of the conductive agent yielded normally and acceptably conductive particle boards.

| AVERAGE BOARD PHYSICAL PROPERTIES | |
|---|---|
| Density, lbs. per cubic foot | 45 |
| Modulus of Rupture, lbs. per square inch | 2500 |
| Modulus of Elasticity, lbs. per square inch | 450,000 |
| Internal Bond, lbs. per square inch | 200 |
| Thickness Swell (24 hour immersion), percent | 8 |
| Water Adsorption (24 hour immersion), percent | 12% |
| Linear Expansion (24 hour immersion), percent | 0.3 |
| Moisture Content, % by weight | 4% |
| Screwholding, lbs. face | 400 |
| edge | 350 |
| Hardness, lbs. | 1,100 |

The electrical conductivity of the particle boards was measured by a device commonly known as a "Megger" manufactured by the Biddle Instrument Company under the designation "MK-IV Resistance Measuring Instrument". The test equipment and procedure are described in the following standards: ASTM 150-72, Underwriters Laboratory 779, ANSI/NFPA 99, and NFPA (National Fire Protection Association) 56-A.

It should be noted that the meter scale on the Megger instrument, from which resistance values in ohms per square centimeter of product surface are read, is an exponential scale. Resistances up to 10 million ohms may be determined accurately. However, the next and final scale division above 10 million ohms is infinite resistance. In order to make resistance comparisons reasonably possible for these experiments, the infinite reading on the scale was considered to be 20 million ohms, thus permitting the interpolation of resistance readings between 10 and 20 million ohms.

Therefore, the true electrical resistance of any value above 10 million ohms listed in the supporting tables is actually higher than the number shown. For example, a recorded value of 11 million ohms represents an actual resistance moderately higher than that number, while a recorded value of 19 million ohms is really approaching infinite resistance. In summary, any resistance value above 10 million ohms in the following experimental data is considered too high and variable to represent a useful level of product conductivity.

Early test observations on the conductive particle boards of this invention indicated that variations in board surface roughness influenced the accuracy and reproducibility of electrical conductivity measurements. For instance, when sanded boards were exposed to a high humidity environment to observe its effect on conductivity and the board surfaces became roughened by the moisture absorption of individual chips, the electrical contact between the board surfaces and the Megger electrodes became variable and unreliable. To overcome this problem, paint grade dry aluminum powder was rubbed onto the opposing surfaces of test specimens to ensure adequate electrical contact with the electrodes regardless of surface roughening or sandpaper grit size. After this surface treatment, the conductivity measurements immediately became consistent and reproducible.

We have used this modification of the ANSI/NFPA 99 test procedure to make every electrical conductivity measurement listed in the tables of data which follow.

In the ensuing discussion the following abbreviations are employed:

| K | 1,000 |
|---|---|
| M | 1 million |
| m.c. | moisture content |
| cond. | conditioned |
| Res. | resistance |
| PF | Phenol-formaldehyde resin |
| PRF | Phenol-resorcinol-formaldehyde resin |
| MF | Melamine-formaldehyde resin |
| UF | Urea-formaldehyde resin |
| MDI | Polymeric methylene diphenyl diisocyanate resin |
| CaSSL | Calcium-base spent sulfite pulping liquor concentrated to 50% aqueous solution. |
| ISO | Polymeric isocyanate-resin |
| ISO.LIG | Polymeric isocyanate-lignin residue combinations. (U.S. Pat. No. 4,279,788) |

To determine the effect of particle size and shape on board electrical conductivity, a series of panels was made employing furnishes comprising wood particles of various mesh size (U.S. sieve series). Two of the panels contained steam conditioned, disc-refined wood fiber as opposed to the mechanically comminuted wood employed in the others.

Two very conductive substances, "Pfizer's LB1011" lampblack and "Cabot's XC-72 R" carbon black were used in ample quantities to prepare the panels so that the question of conductivity related only to wood particle size and configuration and not to the properties of the electrically conductive agent. The results are shown in Table 1.

Experiment 45 employed particles which consisted entirely of particles 60-mesh through 200-mesh in size. There were no coarse particles present in the panel.

Experiment 54 tested panels consisting entirely of 40 millimeter wood flakes and strands with no fine particles present. All three panels demonstrated excellent conductivity (1,000 to 9,000 ohms per square centimeter). For the purposes of this study panels having resistances within the broad range of from 1,000 to 10 million ohms were considered acceptable for some category of electrically conductive products.

The panel tested in experiment 47, made with the maximum amount of long refined fiber, i.e. 17 percent, which could be tumbled in a normal particle board blender without agglomerating into balls demonstrated excellent conductivity (1,000 ohms per square centimeter). However, the panel tested in experiment WSU11 made with 100 percent of refined long fiber showed infinite electrical resistance; that is, no conductivity.

It thus is demonstrated that wood particles of a wide variety of shapes and sizes can be made conductive in a medium and high board density range of 35 to 65, preferably 40 to 60 pounds per cubic foot while pure fibers cannot. This phenomenon relates to the intimacy of surface contact (by definition, interparticle bonding) among irregularly shaped particles which are compressed into complete accommodation with each other via heat, pressure and moisture into boards of medium or higher density, causing them to form continuous conductive paths when coated with carbon black, versus an apparent lack of adequate surface contact among individual long fibers when similarly coated and densified unless compressed to a very high and uneconomic density which is not of interest in the presently described applications.

The unsuitability of long refined wood fibers for the present purposes is further illustrated in the following study. For this study, long refined fibers produced by

TABLE 1

Furnish Particle Size and Type

| | Mesh Size Analysis, % | | | | | | | | Refined Fiber % | Electrical Resistance ohms/sq. cm. | | | |
|---|---|---|---|---|---|---|---|---|---|---|---|---|---|
| | | | | | | | | | | 1-day (dry) | | 30-day (Cond.) | |
| Expt. No. | On 4 | On 8 | On 18 | On 32 | On 60 | On 100 | On 200 | Thru 200 | | Res. | % M.C. | Res. | % M.C. |
| 44 | 0 | 100 | 0 | 0 | 0 | 0 | 0 | 0 | 0 | 1K | 3.17* | 4K | 11.20 |
| 45 | 0 | 0 | 0 | 0 | 0 | 44 | 35 | 21 | 0 | 9K | 3.17* | 13K | 10.70 |
| 32 | 0 | 5 | 46 | 28 | 13 | 5 | 3 | 1 | 0 | 1K | 3.14 | 6K | 9.25 |
| 47 | 0 | 4 | 38 | 23 | 11 | 4 | 2.2 | 0.8 | 17 | 1K | 3.17* | 3K | 11.38 |
| 11 WSU | 0 | 0 | 0 | 0 | 0 | 0 | 0 | 0 | 100 | Inf. | 3.17* | Inf. | 8.19** |
| 54 | 100# | 0 | 0 | 0 | 0 | 0 | 0 | 0 | 0 | 1K | 3.17* | — | — |

Binder: 4.5% MDI
Carbon Black:
2.0% "Cabot XC-72R", all particleboards
3.0% "Pfizer LB1011", WSU fiberboard
NOTE: The mesh size analysis for Expt. No. 32 represents the commercial particle board chip furnish used for all other experiments not listed in this table.
*Dry M.C. average for 37 panels.
**Dry M.C. average for 2 medium density fiberboards.
Potlatch 40 millimeter White Fir Mixed Flakes and Strands.

Experiments 44, 45 and 54 indicate that particle size as such is not a determinant of electrical conductivity of the panels. In experiment 44, all the chips were between ¼ and ⅛-inch mesh size. There were no fine particles present in the board.

the commercial steam pressure-refining of Douglas Fir chips were employed, together with a range of binders, and lamp black content, to form a series of panels of varying specific gravity. The results are summarized in Table 2.

TABLE 2
Low and Medium Density Fiberboard Experiments

| Board No. | Board Thickness | Resin Type | Resin Content % | Pfizer LB-1101 Lampblack (%) | Specific Gravity | Press Time (min.) | Dry Electrical Resistance, ohms/sq. cm. |
|---|---|---|---|---|---|---|---|
| 1 | ¾" | UF | 10 | 1 | 0.70 | 4 | Infinite |
| 2 | " | UF | 10 | 1 | 0.30 | 4 | " |
| 3 | " | UF | 10 | 2 | 0.70 | 4 | " |
| 4 | " | UF | 10 | 2 | 0.30 | 4 | " |
| 5 | " | UF | 10 | 3 | 0.70 | 4 | " |
| 6 | " | UF | 10 | 3 | 0.30 | 4 | " |
| 7 | " | ISO | 4.5 | 1 | 0.70 | 4 | " |
| 8 | " | ISO | 4.5 | 1 | 0.30 | 4 | " |
| 9 | " | ISO | 4.5 | 2 | 0.70 | 4 | " |
| 10 | " | ISO | 4.5 | 2 | 0.30 | 4 | " |
| 11 | " | ISO | 4.5 | 3 | 0.70 | 4 | " |
| 12 | " | ISO | 4.5 | 3 | 0.30 | 4 | " |
| 13 | " | ISO.LIG. | 3.75/0.75 | 1 | 0.70 | 4 | " |
| 14 | " | ISO.LIG. | 3.75/0.75 | 1 | 0.30 | 4 | " |
| 15 | " | ISO.LIG. | 3.75/0.75 | 2 | 0.70 | 4 | " |
| 16 | " | ISO.LIG. | 3.75/0.75 | 2 | 0.30 | 4 | " |
| 17 | " | ISO.LIG. | 3.75/0.75 | 3 | 0.70 | 4 | " |
| 18 | " | ISO.LIG. | 3.75/0.75 | 3 | 0.30 | 4 | " |
| 20 | ¾" | ISO.LIG. | 3.75/0.75 | 2 | 0.70 | 6 | " |
| 21 | ¾" | UF | 10 | 2 | 0.70 | 6 | " |

NOTES:
1. For all boards the carbon black was intensively mixed with the fiber before resin application by spraying.
2. For the iso-lignin boards the lignin was applied separately from the iso.
3. After the resin was applied, the furnish was passed rapidly through a double disc attrition mill with a plate gap of 0.040" to ensure complete resin distribution by wiping transfer.
4. Moisture content into the press was approximately 10%.

As shown, no combination of variables resulted in the production of panels having acceptable electrical conductivity properties.

The next series of experiments addressed the question of whether the non-operative characteristic of steam-conditioned, disc-refined wood fibers in the preparation of electrically conductive panel boards is a function of panel thickness.

To answer this question, a series of experimental boards was prepared using the same steam refined long fibers set forth above. The results are given in Table 3.

TABLE 3
Medium Density Fiberboard Thickness vs Conductivity

| Expt. No. | Binder | Conductive Agent | % | Board Thickness | 1-day (Dry) Res. | 1-day (Dry) % M.C. | 30-day (Conditioned) Res. | 30-day (Conditioned) % M.C. |
|---|---|---|---|---|---|---|---|---|
| WSU 12 | 4.5% MDI | Pfizer LB1011 | 3 | ¾" | Inf. | 3.17* | Inf. | 8.78%** |
| WSU 12A | " | Carbon Black | " | 3/16" | " | " | " | " |
| WSU 12B | " | " | " | ⅛" | " | " | " | " |
| WSU 12C | " | " | " | 1/16" | 19 M | " | 19 M | " |
| WSU 20 | 10% UF | Pfizer LB1011 | 2 | ¾" | Inf. | 3.17%* | Inf. | 8.78%** |
| WSU 20A | " | Carbon Black | " | ¾" | " | " | " | " |
| WSU 20B | " | " | " | 3/16" | " | " | " | " |

*Average dry M.C. for two medium density fiberboard panels.
**Average 30-day conditioned M.C. for two medium density fiberboard panels.

From an inspection of the above data it is apparent that the electrical resistance of all of the medium density fiberboard panels was infinite down to a thickness of 1/16-inch, at which it was measurable, but of the very high level of 19 million ohms. This is an unacceptably high level of resistance for the purpose at hand. (See the previous explanatory note on Megger measurements.)

However, the fact that measurable conductivity is exhibited by boards of 1/16-inch thickness relates to the conductive paper products of the prior art patents, for example U.S. Pat. No. 2,328,198 referred to above. That is, refined fiber-based wood products containing carbon exhibit electrical conductivity only when they are very thin, or very dense, or both. For this reason, electrically conductive refined fiber paper products constitute a different class of products from the electrically conductive particle board products which are of interest herein.

To assist in formulating a practical definition of the length-to-width ratio at which wood particles cease to be operable (for present purposes) chips, flakes or strands, and start to become inoperable refined fibers, a series of microscopic measurements of length and width of such products was carried out. The results are given in Table 4.

TABLE 4
Width-to-Length Ratios for a Random Selection of Particleboard Chips, Flakeboard Strands and Refined Wood Fibers

| Chips | Flakes;Strands | Refined Long Fibers | Refined Short (broken) Fibers |
|---|---|---|---|
| 17 | 25 | 33 | 10 |
| 15 | 6 | 60 | 30 |
| 6 | 11 | 45 | 20 |
| 4 | 38 | 70 | 20 |
| 8 | 30 | 40 | 15 |
| 8 | 11 | 35 | 30 |
| 8 | 3 | 50 | |
| 16 | 19 | 40 | |
| 15 | 10 | 80 | |
| 6 | 24 | 80 | |
| 22 | | 133 | |

TABLE 4-continued

Width-to-Length Ratios for a Random Selection of Particleboard Chips, Flakeboard Strands and Refined Wood Fibers

| Chips | Flakes;Strands | Refined Long Fibers | Refined Short (broken) Fibers |
|---|---|---|---|
| 12 | | 100 | |
| 16 | | 40 | |
| 18 | | 80 | |
| 9 | | 35 | |
| 8 | | 70 | |
| 1 | | 40 | |
| 3 | | 90 | |
| 10 | | 120 | |
| 7 | | 80 | |

The results of Table 4 indicate that operable chip dimensions may be defined from inoperable refined fiber dimensions by specifying maximum chip lengths of 3½ inches and width to length ratios of from 1—1 to 1-20. The same consideration applies to preferable flake sizes.

A minimum width-to-length ratio range of about 1-40 is indicated for the refined wood fibers disclaimed as inoperable.

The values given in the "Flakes; Strands" column of Table 4 present a complication since the maximum width-to-length ratio needed to adequately define all operable strand or sliver type particles is about 40. To accommodate this difference, it is pointed out that while some strands may have the same width to length ratio as some of the shorter refined fibers, they are many times thicker in width and cross section. In other words, they are stiff wooden slivers and not thin, curly wood fibers. Thus it is possible to differentiate the wood particle strands of the present invention by limiting the maximum width-to-length ratio for suitable chips to 1-20, or 1-40 if their minimum width is 1 millimeter. By comparison, the width and thickness of refined wood fibers are hardly more than a tenth of a millimeter, hence their pronounced tendency to curl.

The small proportion of short or broken refined wood fibers listed in the last column of Table 4 simply represents the inevitable "fines" that are a by-product of any wood size reduction process. A certain proportion of these process fines can be tolerated in the production of the presently described electrically conductive wood particle board. This conclusion is also confirmed in experiment 47 of Table 1, which indicates that a certain proportion of refined long fiber can in fact be tolerated in a particle board and still yield a usefully conductive product.

The limit to the long fiber content is strictly physical. Long fiber can be tolerated up to the point where it causes the resin-particle blending operation to produce entangled balls of chips and fiber instead of a continuous free flow of resin-coated particles. The data presented herein indicate that the latter undesirable condition exists at a long refined fiber content of about 17 to 20 percent by weight.

b. The Electrically Conductive Component

Next a series of experiments was carried out to indicate the identity and characteristics of the electrically conductive component of the board making furnish. Electrically conductive particles tested were various forms of carbon particles, electrically conductive salts, and electrically conductive metal powders and metal oxides.

(1) Carbon Particles

Carbon particle varieties of potential use in the present application comprise lamp black, furnace black, smoke black, and other varieties generically termed "carbon black"; charcoal; graphite; coal coke; petroleum coke, and calcined petroleum pitch.

Representative samples of the foregoing were mixed in varying proportion into the particle board furnish, and fabricated into wood particle boards using the general procedure outlined above. Carbon products having various particle sizes were tested to determine the effect of particle size on conductivity. Since the carbon particles are available in the form of powders sub-micron in size and far beyond the capability of screen mesh testing to describe, there was selected as a definitive fineness measurement a specific surface test procedure, ASTM method 819-77, i.e. the Brunauer, Emmett, and Teller (BET) test method. This method is based on the absorption of a monolayer of nitrogen gas at its normal boiling point on the carbon or graphite particle surfaces. The unit of measurement is square meters per gram.

Conductivity tests were carried out on the dry particle board and on the conditioned particle board at moisture content levels approximating maximum normal use levels. The results are given in Table 5.

TABLE 5

| | Carbon Types Evaluated | | Electrical Resistance ohms/sq. cm. | | | |
|---|---|---|---|---|---|---|
| | | Specific | 1-Day (Dry) | | 30-day (Conditioned) | |
| Expt. No. | Type and % Carbon Black | Surface* | Res. | % M.C. | Res. | % M.C. |
| 6 | 2% "Asbury #85" Micro Graphite | 13.2 | Inf. | 3.74% | 18 M | 10.33% |
| 16 | 1% "Asbury #250" Micro Graphite | 19.7 | Inf. | 2.59 | 19 M | 8.87 |
| 17 | 2% "Asbury #250" Micro Graphite | " | 40K | 2.56 | 110K | 8.47 |
| 18 | 3% "Asbury #250" Micro Graphite | " | 3K | 3.33 | 8K | 7.62 |
| 7 | 1% "Pfizer LB-1011" Lampblack | 44 | 15 M | 3.46 | 11 M | 10.86 |
| 9 | 1.5% "Pfizer LB-1011" Lampblack | " | 31K | 3.89 | 135K | 10.34 |
| 10 | 2% "Pfizer LB-1011" Lampblack | " | 9K | 3.69 | 27K | 9.62 |
| 26 | 1% "Asbury 4023" Calcined Petroleum Coke | 15 | Inf. | 2.07 | Inf. | 8.29 |
| 27 | 2% "Asbury 4023" Calcined Petroleum Coke | " | Inf. | 1.83 | 19 M | 8.72 |
| 28 | 3% "Asbury 4023" Calcined Petroleum Coke | " | Inf. | 1.63 | 19 M | 8.23 |
| 33 | 2% "Asbury 4023" Calcined Petroleum Coke | " | 25K | 2.60 | 63K | 9.16 |
| | 0.5% "Cabot XC-72R" Furnace Black | 254 | | | | |
| 30 | 0.5% "Cabot XC-72R" Furnace Black | 254 | 250K | 3.64 | 900K | 9.61 |
| 31 | 1% "Cabot XC-72R" Furnace Black | " | 7K | 2.86 | 14K | 9.20 |
| 32 | 2% "Cabot XC-72R" Furnace Black | " | 1K | 3.14 | 6K | 9.75 |
| | 0.5% "Cabot XC-72R" Furnace Black | " | 720K | 3.27 | 4 M | 9.16 |

TABLE 5-continued

| Expt. No. | Carbon Types Evaluated Type and % Carbon Black | Specific Surface* | Electrical Resistance ohms/sq. cm. | | | |
|---|---|---|---|---|---|---|
| | | | 1-Day (Dry) | | 30-day (Conditioned) | |
| | | | Res. | % M.C. | Res. | % M.C. |
| 34 | 2%"Alcoa 1663" Aluminum Paste | 2 | | | | |
| 35 | 1%"Cabot Sterling SO" Carbon Black | 41 | 19 M | 2.65 | 17 M | 9.53 |
| 36 | 2%"Cabot Sterling SO" Carbon Black | " | 19K | 2.94 | 71K | 9.52 |
| 37 | 3%"Cabot Sterling SO" Carbon Black | " | 4.5K | 2.75 | 12K | 9.11 |

*ASTM 819-77
The BET Method
Square Meters per Gram.

Inspection of the Table 5 data indicates that lamp black, furnace black and, in general, the carbon forms simply designated as carbon black all produce useful levels of conductivity in wood particle board at reasonable levels of addition.

Even calcined petroleum coke, not too finely powdered, can be made to work. Experiment 27 shows that 2% "Asbury 4023" calcined petroleum coke yields infinite resistance at 2.07 percent moisture content. However, by adding 0.5 percent "Cabot - XC-72R", a very finely powdered furnace black, the conductivity becomes 25,000 ohms per square centimeter, a useful level. By comparison, 0.5% "Cabot-XC-72R" furnace black used alone yields a board having a conductivity of 250,000 ohms per square centimeter. Thus, there is an obvious synergistic effect in which the coarser calcined coke particles provide significant conductivity when connected by smaller carbon particles.

By further comparison note experiment 34 in which was used a combination of 2% "Alcoa 1663" aluminum powder with 0.5% "Cabot XC-72R" furnace black. This produced a board having an electrical resistance of 720,000 ohms per square centimeter, or about three times the value obtained if the "Cabot XC-72R" had been used alone in the same amount.

The data of this example indicate that a practical lower limit of particle size fineness for carbon products used as electrically conductive components in the compositions of this invention is about 20 square meters per gram specific surface area, regardless of carbon form. Below this level, such a large percentage of carbon product is required for conductivity that the wood products cannot retain it all, leaving free carbon in the blending system. This is undesirable because the free carbon particles sift and settle to the bottom of the particle mats during processing, leaving unequal distribution in the boards and a blackened, lower-strength back side on the board products.

(2) Electrically Conductinq Metal and Metal-Type Powders

The foregoing procedure was carried out using in place of finely divided carbon particles, equivalent quantities of various electrically conducting metal powders and conductive metal oxides in the same particle size range that was shown to be operational with carbon blacks. These were blended intensively into the particle board chips in the hope of imparting useful levels of electrical conductivity.

The results are given in Table 6.

TABLE 6

| | Non-Carbon Conductive Pigments Tested | | | | | | |
|---|---|---|---|---|---|---|---|
| | | | | Electrical Resistance, ohms/sq. cm. | | | |
| Expt. | | Specific | | 1-day (Dry) | | 30-day (Conditioned) | |
| No. | Conductive Agent | Surface | % | Res. | % M.C. | Res. | % M.C. |
| 29 | "Alcoa 1663"Aluminum Paste | 6 | 3 | Inf. | 1.96 | Inf. | 8.79 |
| 46 | "Magnox NP4701" Iron Oxide | 40 | 10 | Inf. | 3.17* | 15 M | 10.02 |
| 51 | "Mobay AC5123" Cobalt-Epitaxial Gamma Ferric Oxide | 34.5 | 10 | Inf. | 3.17* | 15 M | 10.69 |
| 52 | "Mobay AC5107" Gamma Ferric Oxide | 29 | 10 | Inf. | 3.17* | 11 M | 10.57 |
| 53 | "Mobay AC5127" Cobalt Surface Treated Iron Oxide (Magnetite) | 27.5 | 10 | Inf. | 3.17* | 11 M | 10.34 |

*Dry M.C. Average for 37 panels.

The values outlined above indicate electrical resistance levels so high as to render the boards useless for their intended purpose, i.e. dry electrical resistance levels of infinity. This is in spite of the fact that very large quantities of the metal powder or metal oxide powder, up to 10% of the dry weight of the wood chips, were employed.

(3) Electrically Conductive Salts

By the same general procedure, a series of particle boards was prepared using a variety of electrically conductive salts in place of the finely divided carbon particles. The salts were employed with and without humectants (glycerine and ethylene glycol), which might theoretically enhance conductivity by drawing atmospheric moisture into the boards as a conductive phase for the salts. The results are given in Table 7.

TABLE 7

| | Dissolved Salts and Humectants Evaluated | | | |
|---|---|---|---|---|
| Expt. No. | Type of Salt or Additive | Binder | %* | Dry Electrical Resistance, ohms/sq. cm. |
| 3 A | Sodium Chloride | 9% UF | 8.1% | Inf. |
| 11 A | Sodium Chloride | 9% UF | 17.0% | Inf. |
| 8 A | Sodium Chloride Glycerine | 9% UF | 10.0% 15% | Inf. |

TABLE 7-continued

Dissolved Salts and Humectants Evaluated

| Expt. No. | Type of Salt or Additive | Binder | %* | Dry Electrical Resistance, ohms/sq. cm. |
|---|---|---|---|---|
| 9 A | Urea | 5% PF | 10.0% | Inf. |
| 10 A | Glycerine | 5% PF | 22% | Inf. |
| 13 A | Borax/Boric Acid | 9% PF | 2%** | Inf. |
| 14 A | Ethylene Glycol | 8% UF | 18% | Inf. |
| 24 A | "Kenrich 238 M"*** | 8% UF | 0.5% | Inf. |
|  | "Kenrich LICA38J"*** |  | 0.5% |  |
| 25 A | "Asbury 4431"Calcined Petroleum Coke | 8% UF | 2.0%# | Inf. |
|  | "Kenrich 238 M" |  | 0.5% |  |
|  | "Kenrich LICA38J" |  | 0.5% |  |

*Salts and Additives were dissolved in resin binder, so the amounts shown are percentages of binder weight, not dry wood weight.
**Dry chips were soaked in 20% borax/boric acid solution and were redried to 4.0% M.C. Estimated addition, 2% based on dry chip weight.
***Kenrich 238 M and LICA38J are reaction catalysts and highly conductive Zirconate salts.
2.0% based on dry chip weight.

The unsuitability of typical electrically conductive salts, used with and without humectants, is indicated by the infinite electrical resistance measurements obtained in all cases.

c. The Particle Board Adhesive Component

Also employed in the hereindescribed electrically conductive lignocellulose particle board is a suitable adhesive or binder of a character and used in an amount suitable for obtaining the desired board physical properties. A wide variety of such adhesives may be employed, in aqueous or non-aqueous solution. All are of the class known to the trade as "thermosetting particle board resins". Illustrative are > Methylene diphenyl diisocyanate resins
> Urea-formaldehyde resins
> Melamine-urea-formaldehyde resins
> Melamine-formaldehyde resins
> Phenol-formaldehyde resins
> Phenol-resorcinol-formaldehyde resins
> Resorcinol-formaldehyde resins
> Polymeric isocyanate-lignin residue adhesive compositions (See U.S. Pat. No. 4,279,788)

The foregoing and other adhesives are used in amounts sufficient to manufacture boards of saleable strength and performance properties. In general, from 1.5–15%, preferably 3–12%, of adhesive, dry solids basis is employed. In the event the board is made from a laminar mat, different adhesives may be employed in the mat layers. For example a methylene diphenyl diisocyanate adhesive may be used in the core layer and a phenol formaldehyde or melamine formaldehyde adhesive may be used in the face layer.

To test the suitability of various resin adhesives, the experiments outlined in Table 8 were performed. In each case, the general procedure of board formation outlined above was employed.

TABLE 8

Binder Types and Levels

| | | | | Electrical Resistance, ohms/sq. cm. | | | |
|---|---|---|---|---|---|---|---|
| | | | | 1-Day (Dry) | | 30-Day (Conditioned) | |
| Expt. No. | Binder Type | % | Type and % Carbon Black | Res | % M.C. | Res. | % M.C. |
| 2 | UF | 8 | 2% "Pfizer LB-1011" | 11K | 4.23 | 78K | 10.28 |
| 4 | UF | 12 | 2% "Pfizer LB-1011" | 11K | 3.70 | 110K | 9.59 |
| 10 | MDI | 4.5 | 2% "Pfizer LB-1011" | 9K | 3.69 | 27K | 9.62 |
| 7 | " | 4.5 | 1% "Pfizer LB-1011" | 15 M | 3.46 | 11 M | 10.86 |
| 11 | " | 3 | 1% "Pfizer LB-1011" | 9 M | 3.60 | 12 M | 10.02 |
| 12 | " | 6 | 1% "Pfizer LB-1011" | Inf. | 3.98 | 13 M | 9.81 |
| 15 | MDI | 3.75 | 2% "Pfizer LB-1011" | 8K | 3.64 | 28K | 10.43 |
|  | Ca SSL | 0.75 |  |  |  |  |  |
| 48 | MF | 6 | 2% "Cabot XC-72R" | 2K | 3.17* | 7K | 11.23 |
| 49 | PF | 6 | 2% "Cabot XC-72R" | 3K | 3.17* | 8K | 11.78 |
| 50 | PRF | 6 | 2% "Cabot XC-72R" | 2K | 3.17* | 6K | 10.94 |

*Dry M.C. average for 37 panels.

The foregoing results using six different thermosetting adhesive resinous compositions in carbon-conductive particle board indicated the very low electrical resistance of each board product, using only 2% or less of an appropriately fine carbon product. Thus, binder type as such is not a critical consideration.

To test the effect of binder blending order, if any, the experiments outlined in Table 9 were carried out, again using the general board forming procedure outlined above.

TABLE 9

Blending Order

| Expt. | Board Thickness | Blending Order | Elec. Res. ohms/sq. cm. 1-day (Dry) | |
|---|---|---|---|---|
| | | | Res. | % M.C. |
| 18A | ¼" | Chips blended with 1½% lampblack #, then with 8% UF resin and water | 8K | 3.17%* |
| 23A | ¼" | Chips blended with 8% UF resin and water, then with 1½% | 9K | 3.17%* |

TABLE 9-continued

| | | Blending Order | Elec. Res. ohms/sq. cm. 1-day (Dry) | |
|---|---|---|---|---|
| Expt. | Board Thickness | Blending Order | Res. | % M.C. |
| | | lampblack # | | |

*Dry M.C. average for 37 panels
Pfizer LB1011.

The results indicate that there is no difference in the electrical conductivity properties of the finished board whether the conductive agent is blended with wood particles before or after the application of the resin binder. The resistance values obtained were virtually identical.

A series of particle boards was prepared using the general procedure described above, but of varying thicknesses in order to evaluate the effect, if any, of board thickness on electrical conductivity of the board. The results are given in Table 10.

as that of thinner boards on exposure to high humidity over time.

Although board and panel products manufactured in the manner described above have superior, uniform, and regulatable properties of electrical conductivity, their properties can be improved still further by applying a coating of electrically conducting particles to their exterior surfaces after manufacture. Such a coating may comprise finely divided carbon particles, finely divided electrically conducting metal particles, and the like. In one manner of application, finely divided carbon particles of the categories above described are merely sprinkled on the surface of the board, or wiped thereon after the board has been sanded to finished thickness. Alternatively, aluminum particles in the form of a paste may be wiped on the surface.

Such a treatment compensates for the swelling tendency of wood particle boards on being exposed to moisture. Upon such swelling, fresh areas of wood are exposed which are not coated with electrically conductive material and accordingly may offer resistance to the passage of electric current.

TABLE 10

Particle Board Thicknesses

| | | | | | Electrical Resistance ohms/sq. cm. | | | |
|---|---|---|---|---|---|---|---|---|
| | | | | | 2-day (Dry) | | 30-day (Conditioned) | |
| Expt. No. | Board Thickness | % Carbon Black | Binder | % | Res. | % M.C. | Res. | % M.C. |
| 16 A | ¼" | 1% "Pfizer LB1011" | UF | 8 | 1.7 M | 3.17* | 17 M | 9.60** |
| 17 A | " | 1½%"Pfizer LB1011" | " | " | 11K | 3.17* | — | 9.60** |
| 19 A | " | 2% "Pfizer LB1011" | " | " | 2K | 3.17* | — | 9.60** |
| 1 | ⅜" | 1% "Pfizer LB1011" | UF | 8 | 2.8 M | 4.92 | 18 M | 9.55 |
| 2 | " | 2% "Pfizer LB1011" | " | " | 11K | 4.23 | 80K | 10.28 |
| 7 | " | 1% "Pfizer LB1011" | MDI | 4.5 | 15 M | 3.46 | 12 M | 10.86 |
| 9 | " | 1½%"Pfizer LB1011" | " | " | 31K | 3.89 | 135K | 10.34 |
| 10 | " | 2% "Pfizer LB1011" | " | " | 9K | 3.69 | 25K | 9.62 |
| 30 A | ¾" | 2½%"Pfizer LB1011" | MDI | 4.5 | 3K | 3.17* | 8K | 10.71 |

*Dry M.C. average for 37 panels.
**30-day conditioned M.C. average for 53 panels.

From the above, it is shown that excellent electrical conductivity can be imparted to both thin and thick particle boards by incorporating therein a reasonable percentage of finely divided carbon product. Also, test values in the "30-day resistance" column indicates the electrical conductivity of thicker boards is just as stable Another series of experiments was conducted to determine the long-term efficiency of the presently described electrically conductive particle boards. The boards were those whose properties are summarized in Table 11. These results indicate continued efficient action over a period of two years.

TABLE 11

Two-year Performance of Electrically Conductive Particleboards Maintained Continuously at 65 to 75° F. and 55% Relative Humidity

| | Original Dry. | | | Two-year Conditioned | | |
|---|---|---|---|---|---|---|
| Expt. No. | Board Thickness | Conductivity Ohms/sq. cm. | Moisture Content | Board Thickness | Conductivity Ohms/sq. cm. | Moisture Content |
| 1 B | 0.732" | 3K | 3.17%* | 0.757" | 8K | 10.2% |
| 2 B | 0.362" | 33K | 3.17 | 0.380" | 115K | 11.1% |
| 3 B | 0.347" | 52K | 3.17 | 0.358" | 110K | 11.5% |

*Dry M.C. Average for 37 experimental panels.
Note:
Panel properties remained nearly constant from about 6 months to 2 years.

TABLE 12

Conductivity versus Particleboard Density

| | | | | | Electrical Resistance ohms/sq. cm. | | | |
|---|---|---|---|---|---|---|---|---|
| | | | | Density | 1-day (Dry) | | 30-day (Conditioned) | |
| Expt. No. | % Carbon Black | Binder | % | lb./cu. ft | Res. | % M.C. | Res. | % M.C. |
| 56 | 2 XC-72R | MDI | 4.5 | 35.2 | 7K | 3.02 | — | — |
| 57 | 2 XC-72R | " | " | 40.7 | 4K | 3.39 | — | — |
| 58 | 2 XC-72R | " | " | 44.7 | 2K | 2.89 | — | — |

TABLE 12-continued

Conductivity versus Particleboard Density

| Expt. No. | % Carbon Black | Binder | % | Density lb./cu. ft | Electrical Resistance ohms/sq. cm. | | | |
|---|---|---|---|---|---|---|---|---|
| | | | | | 1-day (Dry) | | 30-day (Conditioned) | |
| | | | | | Res. | % M.C. | Res. | % M.C. |
| 10 | 2 LB-1011 | " | " | 51.4 | 9K | 3.69 | 27K | 9.62 |
| 45 | 2 XC-72R | " | " | 55.2 | 9K | 3.17* | 13K | 10.7 |
| 44 | 2 XC-72R | " | " | 59.4 | 1K | 3.17* | 4K | 11.2 |
| 55 | 2 XC-72R | " | " | 64.7 | 1K | 3.18 | — | — |

*Average Dry M.C. for 37 boards.
This table shows that while there is a moderate positive correlation between conductivity and density, acceptable conductivity can be provided over the range of densities claimed and beyond.

Having thus described our invention in preferred embodiments, we claim as new and desire to protect by Letters Patent:

What is claimed:

1. An electrically conductive lignocellulose particle board comprising, in percent by weight, dry solids basis, a dry-formed, hot-consolidated mixture of:

| Finely divided, electrically conductive carbon particles | 0.2–5 |
|---|---|
| particle board adhesive | 1.5–15 |
| lignocellulose particles | balance | the lignocellulose particles having a maximum dimensions of 3½ inches and comprising at least one member of the group consisting of,
   lignocellulose chips having width to length ratios within the range of from 1—1 to 1-20,
   lignocellulose flakes having width to length ratios within the range of from 1—1 to 1-20,
   lignocellulose strands having width to length ratios of from 1—1 to 1-40, and minimum widths of one millimeter,
the carbon particles having specific surface areas of at least 20 square meters per gram,
the board having a thickness of from ⅛-inch to 2 inches and a density of from 35-65 lbs./cu.ft.

2. An electrically conductive lignocellulose particle board of claim 1 wherein the lignocellulose particles comprise wood particles.

3. An electrically conductive lignocellulose particle board of claim 1 wherein the lignocellulose particles comprise bagasse particles.

4. An electrically conductive lignocellulose particle board of claim 1 wherein the lignocellulose particles comprise rice hull particles.

5. An electrically conductive lignocellulose particle board of claim 1 including up to 20 percent of steam-conditioned, disc-refined wood fibers.

6. An electrically conductive lignocellulose particle board of claim 1 wherein the lignocellulose particles comprise wood chips.

7. An electrically conductive lignocellulose particle board of claim 1 wherein the lignocellulose particles comprise wood flakes.

8. An electrically conductive lignocellulose particle board of claim 1 wherein the lignocellulose particles comprise wood strands.

9. An electrically conductive lignocellulose particle board of claim 1 wherein the carbon particles comprise furnace black particles.

10. An electrically conductive lignocellulose particle board of claim 1 wherein the carbon particles comprise carbon black particles.

11. An electrically conductive lignocellulose particle board of claim 1 wherein the carbon particles comprise lamp black particles.

12. An electrically conductive lignocellulose particle board of claim 1 wherein the carbon particles comprise graphite particles.

13. An electrically conductive lignocellulose particle board of claim 1 wherein the carbon particles comprise finely divided charcoal.

14. An electrically conductive lignocellulose particle board of claim 1 wherein the carbon particles comprise pulverized coke particles having a minimum specific surface area of 10 square meters per gram admixed with at least 10% by weight, based on the weight of the carbon component of the mixture, of carbon black having a specific surface of at least 40 square meters per gram.

15. An electrically conductive lignocellulose particle board of claim 1 including a surface coating of an electrically conductive material.

16. An electrically conductive lignocellulose particle board of claim 1 including a surface coating of carbon particles.

17. An electrically conductive lignocellulosic particle board of claim 1 including a surface coating of electrically conducting aluminum particles.

18. An electrically conductive lignocellulosic particle board of claim 1 wherein the adhesive comprises a urea formaldehyde particle board adhesive.

19. An electrically conductive lignocellulose particle board of claim 1 wherein the adhesive comprises a melamine-formaldehyde particle board adhesive.

20. An electrically conductive lignocellulose particle board of claim 1 wherein the adhesive comprises a phenol formaldehyde particle board adhesive.

21. An electrically conductive lignocellulose particle board of claim 1 wherein the adhesive comprises a phenolresorcinol-formaldehyde particle board adhesive.

22. An electrically conductive lignocellulose particle board of claim 1 wherein the adhesive comprises a methylene diphenyl diisocyanate particle board adhesive.

23. An electrically conductive lignocellulosic particle board of claim 1 wherein the adhesive comprises a ligninpolyisocyanate particle board adhesive composition.

24. An electrically conductive lignocellulose particle board of claim 1 wherein the board is laminar and the adhesive comprises a methylene diphenyl diisocyanate particle board adhesive in a core layer and a phenol-formaldehyde particle board adhesive in a face layer.

25. An electrically conductive lignocellulose particle board of claim 1 wherein the board is laminar and the adhesive comprises a methylene diphenyl diisocyanate particle board adhesive in a core layer and a melamine formaldehyde particle board adhesive in a face layer.

26. An electrically conductive lignocellulose particle board of claim 1 wherein the lignocellulose particles comprise wood particles having a moisture content of up to 15 percent by weight and the particle board product has a density of 35 to 65 pounds per cubic foot and an electrical resistance of from 1,000 to 10 million ohms per square centimeter.

* * * * *